United States Patent [19]

Crowe et al.

[11] 4,329,228

[45] May 11, 1982

[54] FILTER PLATE FOR HORIZONTAL PLATE FILTER

[75] Inventors: William D. Crowe, San Franciso; Darrell E. Snell, Tiburon, both of Calif.

[73] Assignee: J. R. Schneider Co., Inc., Corte Madera, Calif.

[21] Appl. No.: 237,209

[22] Filed: Feb. 23, 1981

[51] Int. Cl.³ .............................................. B01D 25/12
[52] U.S. Cl. .................................... 210/230; 210/231
[58] Field of Search ...................... 210/223, 230, 231

[56] References Cited

U.S. PATENT DOCUMENTS

| | | | |
|---|---|---|---|
| 905,341 | 12/1908 | Merrill | 210/225 X |
| 2,867,288 | 1/1959 | Turner | 210/225 X |
| 4,065,390 | 12/1977 | Schneider et al. | 210/231 X |
| 4,229,304 | 10/1980 | Fisher | 210/231 |

Primary Examiner—John Adee

Attorney, Agent, or Firm—Townsend and Townsend

[57] ABSTRACT

An improved filter plate of the type used with a vertical stack of other such plates to form an industrial filter of the type known as a horizontal plate filter. The improved filter plate has a generally upright side wall, and a divider plate or transverse planar plate portion secured to the side wall below the upper margin thereof. An open top trough is formed in the divider plate to receive the filtrate passing through a filter medium above the filter plate when the latter forms a part of a horizontal plate filter. A hole in the side wall permits the filtrate to be removed from the trough. The filter plate further includes a fluid inlet conduit and an air vent/blowdown conduit extending through the side wall into the space below the divider plate. The trough and removable conduits eliminate the need for fixed baffles for use as the fluid inlet, outlet, and blowdown means as found in a conventional filter plate.

10 Claims, 11 Drawing Figures

FILTER PLATE FOR HORIZONTAL PLATE FILTER

This invention relates to improvement in the construction of industrial filters of the type known as horizontal plate filters and, more particularly, to an improved filter plate for such a filter.

BACKGROUND OF THE INVENTION

Horizontal plate filters are commonly used for various industrial application for filtering different types of liquids, such as coolants for machines. A typical filter for this use is disclosed in U.S. Pat. No. 4,065,390.

Filters of the horizontal plate type have been considered for use in filtering liquids which comprise foods, pharmaceutical preparations and other substances containing bacteria; however, conventional horizontal plate filters are designed and constructed in a manner such that it is extremely difficult or practically impossible to adequately clean the parts of the filter plates of the filter to meet sanitation requirements and to prevent contamination of filtrate passing through the plates. Specifically, filter plates of this type of filter generally have fixed manifolds interiorly of the plates. These manifolds have inner surfaces which cannot be properly reached by a cleaning solution, such as a high pressure jet of hot water or steam. Moreover, such manifolds do not have the quality of finish that is required for food or pharmaceutical grade service. Also, crevices are formed interiorly of the manifolds when the manifolds are welded to the adjacent walls, and these crevices collect filtered matter and are virtually impossible to clean properly, thus promoting bacterial and fungal growth in the manifolds. The crevices will also concentrate mildly corrosive substances and promote the phenomenon commonly called crevice corrison which leads to rapid weld failure and the inclusion of corrosion products in the filtrate.

Because of the foregoing drawbacks of conventional filters of the horizontal plate type, a need has arisen for an improved filter plate for such a filter so that the filter can be used for food and pharmaceutical grade service.

SUMMARY OF THE INVENTION

The present invention satisfies the aforesaid need by providing an improved filter plate for horizontal plate filter wherein the filter plate has one or more removable inlet conduits and one or more removable air vent/blowdown conduits so that the conduits can be separated from the filter plate and cleaned individually while the plate itself can be thoroughly cleaned when the conduits are removed. The filter plate also has an improved outlet in the form of an open top trough formed as an integral part of the central divider plate or transverse planar plate portion normally found in a filter plate of a horizontal type plate filter. This allows the filtrate passing through the filter medium above the divider plate to pass into the trough and out of the filter plate through a side opening for passage to a remote location. The trough itself is formed by welding a pair of sides and a bottom to the divider plate, and the welding can be done from both sides of the divider plate, thereby avoiding the formation of crevices which could collect filtered material to cause crevice corrison.

The primary object of the present invention is, therefore, to provide an improved filter plate for use in a horizontal plate filter wherein the filter plate is constructed so that it can be readily and thoroughly cleaned to thereby permit it to be used for food and pharmaceutical grade service in a manner not possible with conventional horizontal plate filters.

Another object of the present invention is to provide an improved horizontal plate filter in which the filter has a number of vertically stacked filter plates of improved construction wherein each filter plate can be partially disassembled and thoroughly cleaned to meet sanitation requirement to thereby permit the filter itself to be used in food and pharmaceutical grade service.

Another object of the present invention is to provide an improved filter plate of the type described wherein the filter plate has removable inlet and blowdown conduits and an open top trough in the divider plate thereof to collect filtrate, whereby the conduits can be removed and individually cleaned while the filter plate, including the trough, can be readily cleaned when the conduits are removed, thus rendering the filter plate suitable for use in filtering liquids containing bacteria.

Other objects of this invention will become apparent as the following specification progresses, reference being had to the accompanying drawings for an illustration of a prior art horizontal plate filter and a horizontal plate of the present invention.

IN THE DRAWINGS

Figure 3:
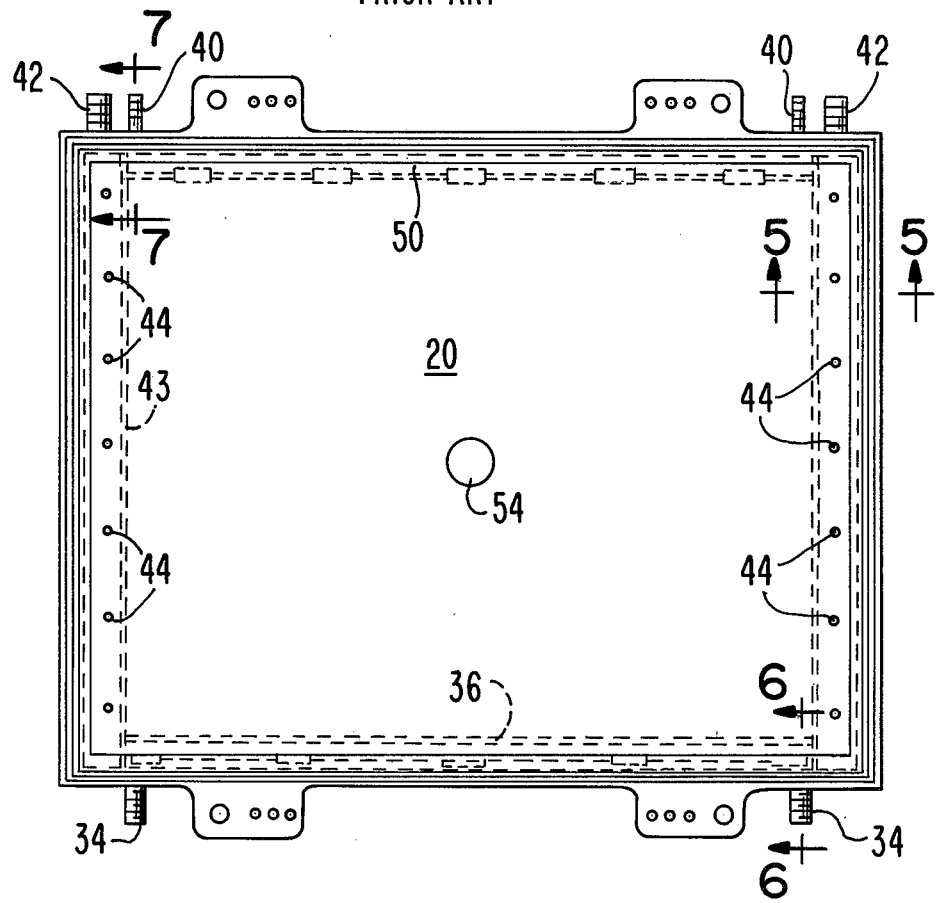
FIG. 3 is a top plan view of one of the plates of the stack.
Figure 5:
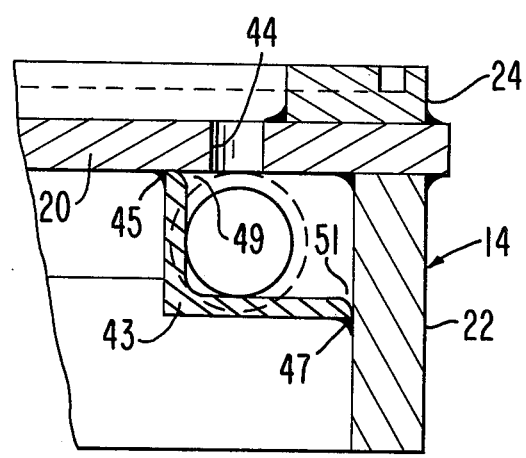
Figure 6:
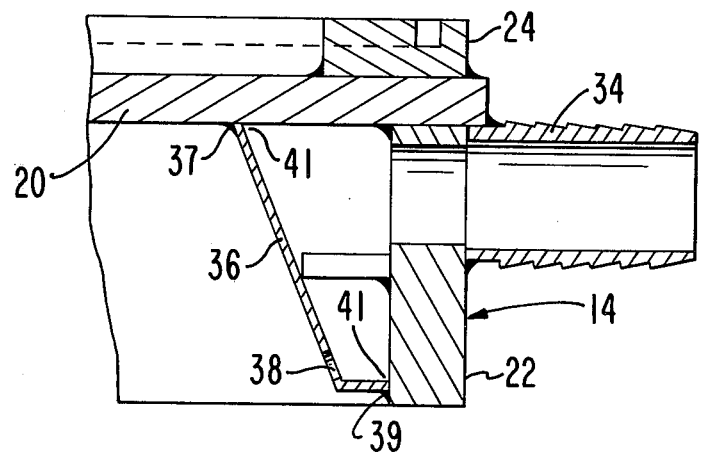
Figure 7:
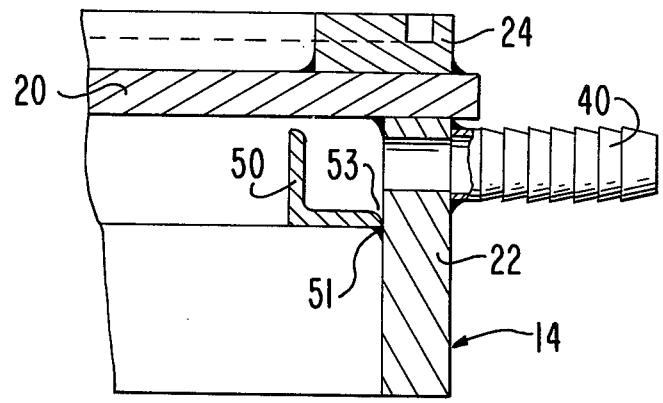
Figure 8:
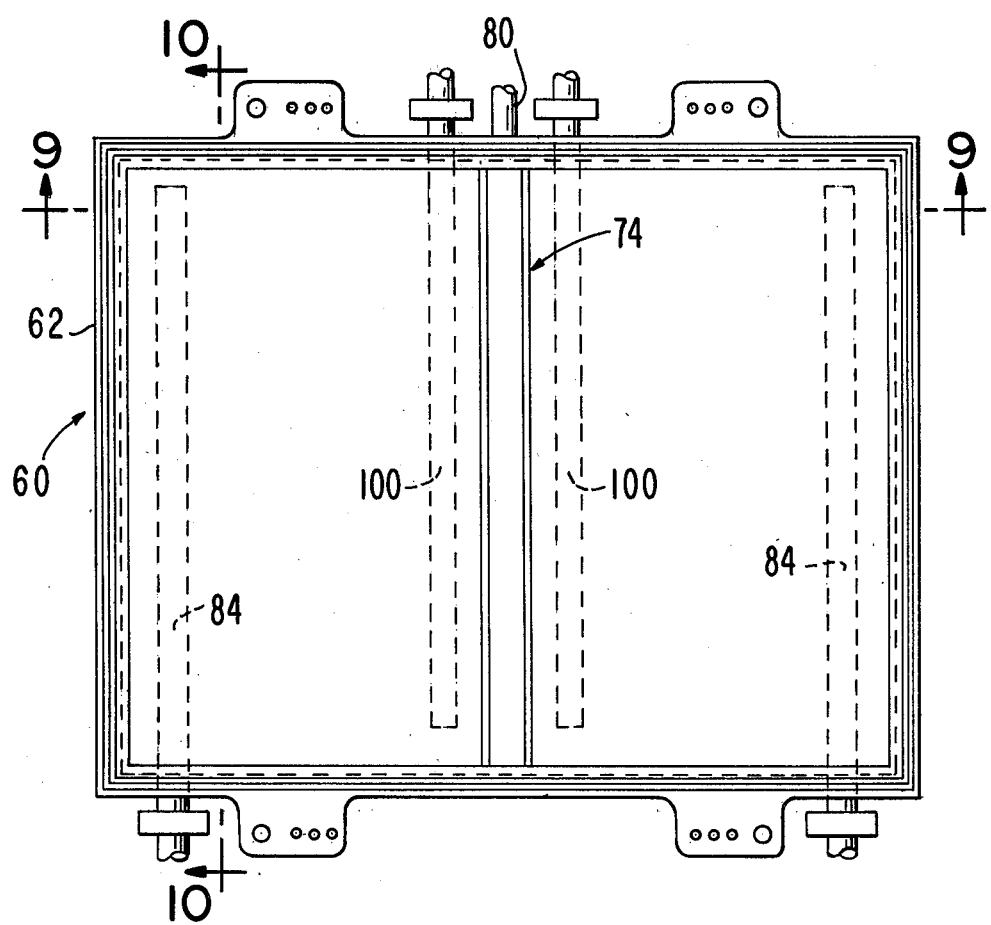
Figure 9:
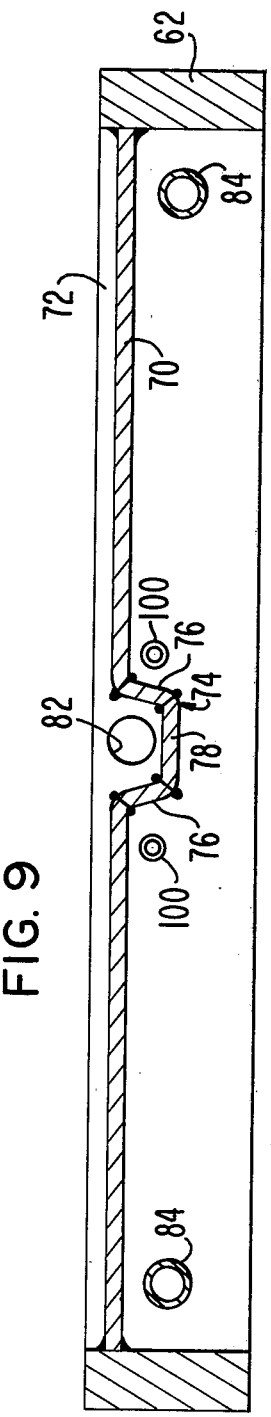
Figure 10:
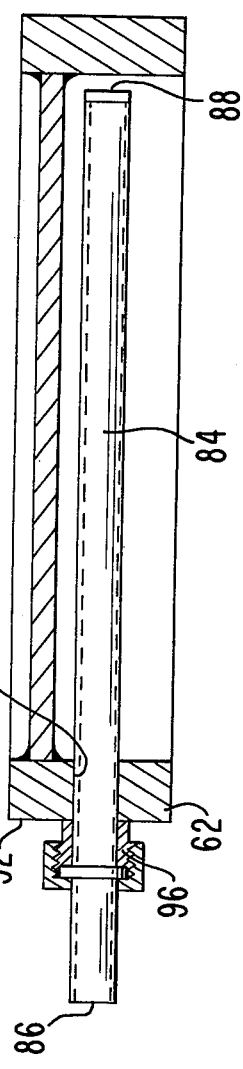

FIGS. 5, 6, and 7 are enlarged, fragmentary cross-sectional views taken along lines 5—5, 6—6 and 7—7, respectively, of FIG. 3;

FIG. 8 is a view similar to FIG. 3 but showing a filter plate of the present invention with removable inlet conduits and removable air vent/blowdown conduits;

FIG. 9 is a cross-sectional view taken along line 9—9 of FIG. 8;

FIG. 10 is a cross-sectional view taken along line 10—10 of FIG. 8; and

Figure 11:
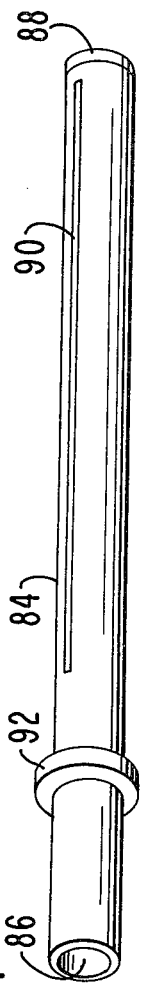

FIG. 11 is a perspective view of a removable inlet conduit separated from the filter plate.

Figure 1:
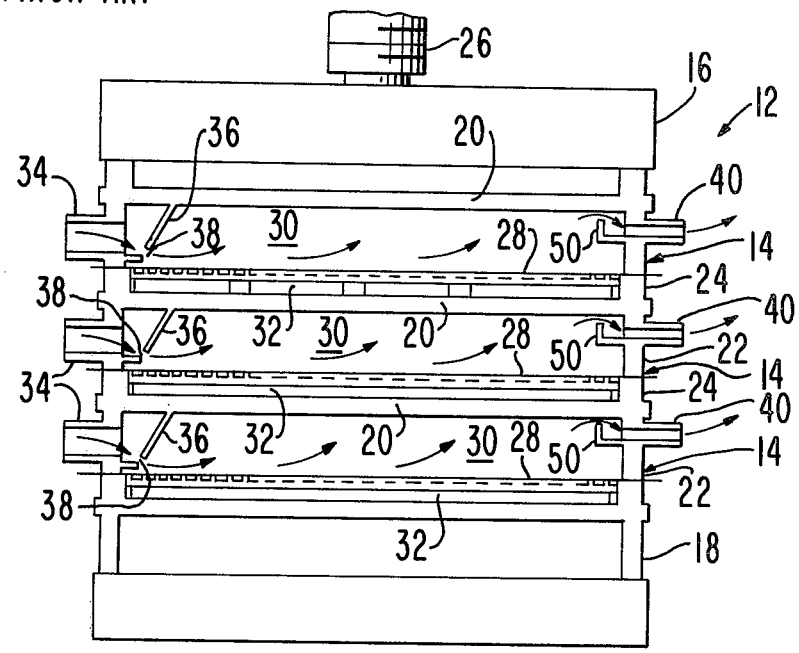
FIG. 1 is a schematic view of a horizontal plate filter of the prior art showing a number of vertically stacked filter plates with filter media between each pair of adjacent plates, a number of arrows indicating the flow of air and gases between the plates during a normal filtration cycle.
Figure 2:
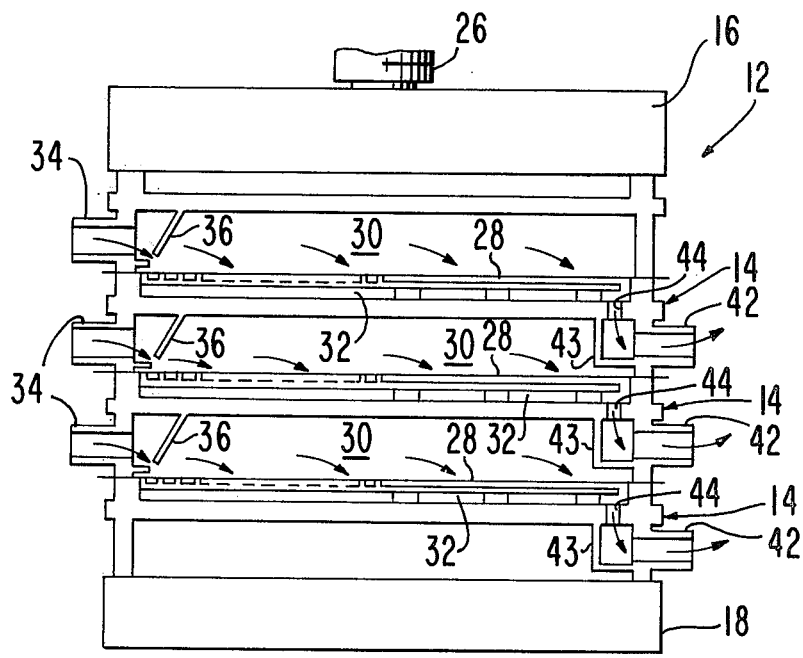
FIG. 2 is a view similar to FIG. 1 with arrows indicating the normal flow of liquid through the filter media during a filtration cycle.

The present invention relates to improvements to an industrial filter of the type known as a horizontal plate filter. A prior art filter of this type is shown in FIGS. 1 and 2 and is denoted by the numeral 12. Filter 12 comprises a vertical stack of two or more filter plates 14, three of which are shown in FIGS. 1 and 2 between upper and lower plates 16 and 18. Each plate 14 has a transverse planar portion or divider plate 20 with a peripheral, downwardly extending lower side wall 22 and a shorter, upwardly extending peripheral upper side wall 24. All of the plates 14 are located between upper and lower plates 16 and 18 and are releasably held together by a suitable linkage structure and a press and separating mechanism, including a screw 26. The way in which the plates are separated to allow filter sheets 28 to be removably placed between adjacent plates 14 is well known. The filter plates and filter sheets 28 define upper and lower chambers 30 and 32 above and below the filter sheets.

Each filter plate has a fluid inlet 34 in its lower side wall 22 and a baffle 36 spaced inwardly from inlet 34 in chamber 30 to present a manifold which extends between opposite side wall segments as shown in FIG. 3. Baffle 36 forms a lower gap 38 (FIGS. 1 and 2) through which liquid to be filtered enters chamber 30 above the adjacent filter sheet 28.

Each filter plate also has a vent port 40 at the opposite side of side wall 22 from inlet 34 for removing unwanted air during a filtration cycle. An L-shaped baffle is adjacent to the inner end of port 40 as shown in FIG. 1. Also, as shown in FIG. 2, each filter plate has one or more drain ports 42 in the lower side wall 22 thereof for filtered liquid that feeds downwardly through ports 44 in divider plate 20. An L-shaped baffle 43 is interiorly of the filter plate near ports 42.

During a normal filtration cycle, liquid to be filtered enters inlets 34, flows through gaps 38 and enters chambers 30. The liquid passes downwardly through filter sheets 28 and into chambers 32 and then through drain ports 44 for flow outwardly of the filter through outlets 42. Also, during a normal filtration cycle, gas and air is forced out of chamber 30 as shown in FIG. 1 past upright baffles 50 and into and through vent ports 40. Ports 40 also permit blowdown air to enter chambers 30 during a blowdown cycle.

Figure 4:
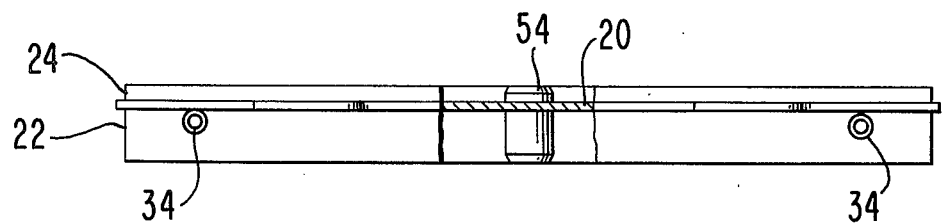
FIG. 4 is a side elevational view, partially in section, of the filter plate of FIG. 3.

Each filter plate further has a central support 54 (FIGS. 3 and 4), commonly called a horn which is required to prevent excessive deflection of divider plate 20. Horn 54 is expensive to fabricate and to machine, and the horn effectively decreases the net filter area available in the corresponding filter plate 14.

FIGS. 5, 6, and 7 show the way in which the baffles associated with inlets 34, outlets 42 and vent ports 40 are secured by a welding to the adjacent parts of the corresponding filter plate 14. For instance, in FIG. 5, baffle 43 is welded at locations 45 and 47 to divider plate 20 and lower side wall 22. Baffle 43 can only be welded from one side because it is not possible to weld at locations interiorly of the baffle. This leaves crevices 49 and 51 inside the manifold formed by the baffle. Such crevices will collect filtered matter and are so inaccessible that they are virtually impossible to clean properly even with a high pressure jet of hot water or other cleaning solution. If filter 12 were to be used for filtering foods and pharmaceutical preparations, these crevices would collect such material and would rapidly promote bacterial and fungal growth which would contaminate subsequent filtered material.

Similarly, baffle 36 shown in FIG. 6 can only be welded at two locations, namely locations 37 and 39 because of the impossibility of welding the baffle to adjacent structure at locations interiorly of the baffle itself. This leaves crevices 41 which, like crevices 49, will collect incoming material to be filtered and, in the case of foods, or other bacteria-containing liquids, will promote bacterial and fungal growth which cannot be tolerated if sanitary standards are to be met. FIG. 7 shows baffle 50 which is secured by a welding at location 51, leaving an inaccessible crevice 53 for collecting filtered matter.

In addition to the foregoing problems, the crevices described above with respect to FIGS. 5-7 concentrate mildly corrosive substances, promoting the phenomenon commonly called crevice corrosion. This type of corrosion leads to rapid weld failure and the inclusion of corrosion products in the filtrate passing through filter 12.

All of the foregoing description relates to a horizontal plate filter of conventional construction. The method of operating and using such a filter is also well known.

The present invention eliminates the problems of cleaning filter plates 14 and eliminates the crevice corrosion problem. The present invention accomplishes this is by the use of removable inlet conduits and removable air vent/blowdown conduits to replace the inlet and air vent/blowdown baffles 36 and 50 (FIGS. 1, 6 and 7) and the use of an open top trough integral with the divider plate to replace baffle 43. By the use of these features, the present invention provides a filter plate which can be quickly, easily and thoroughly cleaned so that it can be used to filter foods, pharmaceutical preparations and other bacteria-containing fluids which require periodic cleaning of the filter to avoid contamination and crevice corrosion.

The improved filter plate of the present invention is shown in FIGS. 8-10 and is denoted by the numeral 60. Filter plate 6 has a generally upright, rectangular side wall 62, and a transverse, generally horizontal planar plate portion or divider plate 70 secured to the side wall by welding at locations above and below the divider plate as seen in FIG. 9. Plate 60 is to be used with one or more additional plates 60 to form a horizontal plate filter in the manner described above with respect to filter plates 14. As shown in FIG. 9, divider plate 70 is spaced below the upper margins of side wall 62. This leaves a space 72 for forming a lower chamber below a filter sheet or medium which extends across the upper margin of side wall 62.

Divider plate 70 has a trough 74 centrally located therein and formed by a pair of spaced, angled sides 76 and a bottom 78, sides 76 and bottom 78 being welded together on both sides of divider plate 70 since both sides are accessible for this purpose. The upper margins of sides 76 are welded above and below divider plate 70 to the adjacent marginal edges of divider plate 70. The trough runs from one side wall segment to the opposite side wall segment, and an outlet 80 is secured to and extends laterally from side wall 62. The internal bore 82 of outlet 80 is shown in FIG. 9. The filtrate passing through space 72 from above will flow into trough 74 and then out of the trough through outlet 80.

By virtue of the construction of trough 74, the trough can easily be cleaned because a high pressure stream of water or other cleaning solution can be directed along the upper and lower surfaces of sides 76 and bottom 78. Thus, the trough eliminates the problem of cleaning the interior of baffle 43 (FIG. 5) which communicates with outlet ports 44 of the prior art filter plate 14 shown in FIGS. 2 and 5. Another advantage of the use of the trough is that sides 76 and bottom 78 serve to stiffen planar portion 70 against deflection and eliminates the need for a horn 54 of the type shown in FIGS. 3 and 4 of the prior art filter plate 14.

Filter plate 60 has a pair of removable inlet conduits 84 of the type shown in FIG. 11. Each inlet conduit 84 has an open end 86, a closed end 88, and a longitudinal slot 90 extending throughout a major portion of the conduit as shown in FIG. 11. The conduit also has a collar 92 near open end 86 thereof for use in sealing the conduit when the latter is in an operative position extending into an opening 94 in side wall 62 as shown in FIG. 10. To this end, side wall 64 has a tubular, externally threaded mounting ring 96 secured to and extending outwardly therefrom. Collar 92 is adapted to engage the flat end face of ring 96 to seal the junction therebetween. An internally threaded coupling member 98 can become threadably coupled to ring 96 to hold collar 92 against the ring and thereby rigidly position conduit 84 in filter plate 60 beneath planar portion 70 as shown in FIG. 10. When so positioned, slot 90 can be at any desired location with reference to divider plate 70. It may be deemed desirable or necessary to have a variation in the volume rate of flow of liquid out of conduit 84 through slot 90. To this end, the slot could have a width which increases or decreases as closed end 88 is approached or conduit 84 itself could be made so that its cross-section decreases or increases as closed end 88 is approached.

For cleaning purposes, each conduit 84 can be quickly and easily removed from filter plate 60 by separating coupling number 98 from ring 96. Both conduits 84 can be withdrawn and cleaned individually while cleaning solution can be directed into the interior of filter plate 60 above and below divider plate 70 to clean the inside and outside of the filter plate. Both the interior and exterior of the filter plate are free of crevices which can give rise to crevice corrison or which could collect the filtered matter as described above with respect to conventional filters.

A pair of air vent/blowdown conduits 100 are provided on opposed sides of and generally parallel with trough 74 as shown in FIGS. 8 and 9. Conduits 100 are removably mounted to side wall 62 in the same manner as described above with the removable mounting of inlet conduits 84. Thus a description described above with respect to conduits 84 will suffice for the removable mounting of conduits 100. Blowdown conduits 100 will permit cleaning of the conduits individually after they have been removed from the filter plate, and cleaning of the interior and exterior of filter plate 60 can also be accomplished to avoid the problems associated with conventional filters as described above with respect to FIGS. 1-7. Also, the slots or openings in conduits 100 can be of any suitable size, shape or at any suitable location along the conduit to achieve proper venting or blowdown operation as is desired or required.

The present invention provides an improved filter plate for use in forming a filter of the horizontal plate type wherein the filter plate allows the filter to be cleaned properly to eliminate the possibility of bacterial and fungal growth in or on the filter plate itself. Also, the way in which the filter plate is made avoids the formation of crevices at joints between adjacent parts of the filter plate. Thus, crevice corrison cannot occur with the filter plate of this invention. Also, the filter plate of the present invention is one which allow better flow distribution of the incoming material to be filtered and further allows for sanitary cleaning to permit the filter to be used with food, pharmaceutical preparations, and other material to be filtered which contains bacterial matter.

What is claimed is:

1. In a horizontal plate filter: a filter plate having a generally upright, polygonal side wall and a divider plate secured to the side wall below the upper margin thereof, said filter plate adapted to be mounted in an operative position below a filter medium with the filter medium engaging the upper margin of the side wall and with the divider plate spaced below the filter medium; means removably mounted on the filter plate for directing a fluid to be filtered into the space within the side wall and below the divider plate; means removably coupled with said side wall for venting said space; and means on the divider plate for forming an open top trough therein, said trough adapted for receiving filtrate from the filter medium thereabove when said filter plate is in said operative position, said side wall having an opening for allowing the filtrate in the trough to flow away from the filter plate.

2. In a filter as set forth in claim 1, wherein said directing means includes a fluid conduit extending into the space and having a side opening communicating with said space, and means removably mounting the conduit on said side wall.

3. In a filter as set forth in claim 2, wherein said side wall has a hole therethrough below said divider plate, there being a mounting ring secured to and extending outwardly from the side wall in alignment with said hole, said conduit having a collar engageable with said ring in sealing relationship thereto, said mounting means including a coupling member engageable with the collar and removably attachable to the ring.

4. In a filter as set forth in claim 1, wherein said venting means includes a fluid conduit extending into the space and having a side opening communicating with the space, and means removably mounting the conduit on said side wall.

5. In a filter as set forth in claim 1, wherein said directing means includes a first fluid conduit removably extending into the space, said venting means including a second conduit removably extending into the space, each conduit being spaced from the other conduit and having an opening communicating with the space.

6. In a filter as set forth in claim 5, wherein the first conduit has an elongated slot extending throughout a major portion of the length of the portion of conduit within the space.

7. In a filter as set forth in claim 5, wherein the first conduit is adjacent to and generally parallel to one segment of said side wall.

8. In a filter as set forth in claim 5, wherein said side wall has a pair of opposed, parallel segments, said trough being located centrally of the side wall and extending generally parallel with said pair of segments, said second conduit being adjacent to and generally parallel with the trough.

9. In a filter as set forth in claim 1, wherein said trough defining means includes a pair of spaced sides secured to and extending downwardly from said divider plate, and a bottom interconnecting the lower ends of the sides, said connections of the sides to the divider plate and to the bottom being welds, said welds being free of crevices interiorly of the trough.

10. In a filter as set forth in claim 1, wherein said side wall has a pair of opposed, generally parallel segments, said trough being centrally located between and generally parallel to said segments, said directing means including a pair of first conduits removably mounted on the side wall and extending into said space adjacent to respective side wall segments, said venting means including a pair of second conduits removably mounted on the side wall and extending into said space on respective sides of the trough, each conduit having an opening communicating with said space, the conduits being generally parallel with the side wall segments.

\* \* \* \* \*